United States Patent [19]

Grimm et al.

[11] Patent Number: 5,407,044
[45] Date of Patent: Apr. 18, 1995

[54] DEVICE FOR LIMITING THE NUMBER OF REVOLUTIONS OF A SHAFT FOR ROTARY DRIVES OF SLIDING ROOFS IN AUTOMOBILES

[75] Inventors: Rainer Grimm, Wetzlar; Jürgen Deckardt, Maintal; Kai Stehning, Bad Soden, all of Germany

[73] Assignee: Rockwell Golde GmbH, Germany

[21] Appl. No.: 119,268

[22] Filed: Sep. 9, 1993

[30] Foreign Application Priority Data

Sep. 12, 1992 [DE] Germany .................. 42 30 580.2

[51] Int. Cl.⁶ ............................................ B60J 7/057
[52] U.S. Cl. .................................. 192/139; 475/162; 74/557; 296/223
[58] Field of Search .................. 192/139; 475/162; 74/547, 557; 296/223

[56] References Cited

U.S. PATENT DOCUMENTS

| 3,948,119 | 4/1976 | Schapp | 475/162 X |
| 4,466,658 | 8/1984 | Furst et al. | 296/223 |
| 5,195,395 | 3/1993 | Wagner | 74/557 |
| 5,224,068 | 9/1993 | Hattass et al. | 192/139 |

FOREIGN PATENT DOCUMENTS

| 1450229 | 9/1976 | United Kingdom . |
| 2151698 | 7/1985 | United Kingdom ......... 296/223 |
| 2247916 | 3/1992 | United Kingdom . |

Primary Examiner—Richard M. Lorence

[57] ABSTRACT

A device for limiting the number of revolutions of a shaft for rotary drives of sliding roofs or sliding-lifting roofs or automobiles. The shaft is rotationally blocked in the closed position and in defined intermediate positions of the sliding lid by the cooperation of an actuating element, controlled by the pivotal movements of the crank arm, with a spring-loaded blocking pin.

10 Claims, 8 Drawing Sheets

DEVICE FOR LIMITING THE NUMBER OF REVOLUTIONS OF A SHAFT FOR ROTARY DRIVES OF SLIDING ROOFS IN AUTOMOBILES

BACKGROUND OF THE INVENTION

1. Field of the Invention

This invention relates to rotary drives and concerns a device for limiting the number of revolutions of a shaft for rotary drives of sliding roofs in automobiles.

2. Description of the Related Art

Typically, a device for limiting the number of revolutions of a shaft for rotary drives of sliding roofs in automobiles, comprises an actuating crank consisting of crank base (4) and crank arm (5), the crank base (4) of which engages force-transmittingly on the shaft (1) and the crank arm (5) of which is connected in articulated manner to the crank base by a pivot pin (6), and comprising an eccentric disc (14), rigidly fixed to the shaft (1), on the circumferential surface of which (disc) there is rotatably journalled a toothed ring (16) provided with an external set of teeth (15), which is surrounded by an internal set of teeth (17) disposed fixed in a rose (7) and concentrically to the shaft axis, the tooth foot radius (dedendum radius) of which is greater than the tooth crest radius (addendum radius) of the toothed ring (16) approximately by the amount of the eccentricity of the eccentric disc (14), wherein abutment means for the limiting positions of the shaft (1) after a predetermined number of revolutions have been reached are connected, on the one hand with the toothed ring (16) and on the other hand with the rose (7), and wherein the abutment means connected with the rose (7) is a blocking pin (19) displaceably guided parallel to the shaft, which (blocking pin) can be engaged (retracted) into the path of the counter-abutment means connected with the toothed ring or disengaged (extended) from it by spring force only in at least one specific position of the toothed ring (16), in the engaged (retracted) position releases both directions of rotation of the drive and in its disengaged (extended) position blocks the drive in both directions of rotation, wherein the counter-abutment means connected with the toothed ring (16) are constructed as circumference steps (31,32) of a blocking ring (28), which is journalled rotatably and concentrically to the shaft (1) in the rose (7), is provided with a radial groove (35) into which an entraining pin (36) fixed to the toothed ring (16) engages, and is equipped, between the circumference steps (31,32), with an annular shoulder (33), which is interrupted at a fixed position, corresponding to the zero setting, and possibly also at least one further position for the passage of the blocking pin (19), wherein furthermore the blocking pin (19), provided with a rotation preventer, possesses a transverse recess (23) for engagement with the annular shoulder (33), wherein finally an actuating element (45), displaceably guided towards the rose (7) is disposed in the crank base (4), which (actuating element) can be brought by rotation of the actuating crank into alignment with the blocking pin (19), with the result that, on actuation, the blocking pin 919), at the specific positions at which the annular shoulder (33) is interrupted, can be engaged (retracted) into the path of the counter-abutment means, such devices are disclosed in the specifications of DT 23 33 666 C3; DE 40 26 754 C1 and U.S. Pat. No. 3,948,119, GB Patent 1 450 229 and GB 2 247 916A. With these well-proven devices it is possible to carry out two different movement sequences with the same shaft, namely optionally sliding or pivoting-out/-pivoting-in respectively of the sliding lid in sliding-tilting roofs, in spite of the different setting displacements for these two movement sequences of different lengths, which are to be limited by means of the device.

In one of the known devices as disclosed in DT 23 33 666 C3, starting from only one indexing or zero setting in which the blocking pin can be actuated, at the commencement of one of the two movement sequences, or in transition from one movement sequence to the other, for example the transition from the sliding movement after the roof has been closed into the outward pivotal movement, the blocking pin simply needs to be engaged into the path of the abutment means connected with the toothed ring in order to cancel out the rotational blocking. The blocking ring here fulfills two functions, namely on the one hand it carries the displacement-limiting abutment means and on the other hand it firmly holds with its annular shoulder the engaged blocking pin, so that the drive can be actuated in both directions of rotation. Disengagement of the blocking pin for blocking the rotational movements is possible here at only one single position, that is when the lid-closed position has been reached. Along the entire travel of the lid closure and outward pivotal movement, the blocking pin remains engaged, so that intermediate positions cannot be blocked.

In the other known device as disclosed in DE 40 26 754 C1, in contrast, the annular shoulder of the blocking ring is provided with at least one further gap to permit passage of the blocking pin, so that at least one further, specified intermediate position of the lid is made possible, in which the drive is rotationally blocked and the lid is effectively secured against undesired sliding or pivoting movements. This rotational blocking and securing takes place as in the zero setting, if the blocking pin is opposite a further gap in the annular shoulder of the blocking ring, so that the blocking pin, as a consequence of the spring force acting on it, can be displaced for blocking the rotary drive.

In both the known forms of embodiment of the device, the actuating element disposed in the crank base for actuating the blocking pin is constructed as a detent bolt, is disposed coaxially to the blocking pin and slidably guided in a detent bushing of the crank base. The detent bolt is displaceable between two detent positions and can be actuated by means of an actuating knob fixed to it. If rotational blockings of the shaft are to be canceled, then with this arrangement of the device the actuating knob has to be pressed in each time. Desired sliding lid movements therefore require an actuation of the knob and the foldable actuating crank. These two actuating steps do not create any difficulty given the ergonomically favorable design of the actuating crank and are rapidly mastered by the users of the vehicle, but in the course of progressively advancing requirements for operating convenience a further simplification is desirable.

An object of the present invention therefore is so to construct a device of the initially named category wherein all actuations can be carried out exclusively by movements of the actuating crank.

SUMMARY OF THE INVENTION

According to the invention there is provided a device for limiting the number of revolutions of a shaft for rotary drives of sliding roofs in automobiles, the device comprising an actuating crank consisting of a crank base and a crank arm, the crank base of which engages force-transmittingly on the shaft, a pivot means for connecting the crank arm in articulated manner to the crank base, an eccentric disc, rigidly fixed to the shaft, a toothed ring rotatably journalled on the circumferential surface of said disc, said toothed ring being provided with an external set of teeth, which is surrounded by an internal set of teeth fixedly disposed in a rose and concentrically to the shaft axis, the tooth foot radius (dedendum radius) of which is greater than the tooth crest radius (addendum radius) of the toothed ring approximately by the amount of the eccentricity of the eccentric disc, abutment means for the limiting positions of the shaft after a predetermined number of revolutions have been reached are connected, on the one hand with the toothed ring and on the other hand with the rose, and wherein the abutment means connected with the rose is a blocking member displaceably guided parallel to the shaft, said blocking pin being engageable into the path of the counter-abutment means connected with the toothed ring or disengageable from it by spring force only in at least one specific position of the toothed ring, wherein in the engaged (retracted) position it releases both directions of rotation of the drive and in its disengaged (extended) position blocks the drive in both directions of rotation, wherein the counter-abutment means connected with the toothed ring are constructed as circumferential steps of a blocking ring which is journalled rotatably and concentrically to the shaft in the rose, is provided with a radial groove into which an entraining pin fixed to the toothed ring engages, and is equipped, between the circumference steps, with an annular shoulder, which is interrupted at a fixed position, corresponding to the zero setting, and optionally also at least one further position for the passage of the blocking pin, wherein furthermore the blocking pin, provided with a rotation preventer, possesses a transverse recess for engagement with the annular shoulder, wherein finally an actuating element, displaceably guided towards the rose is disposed in the crank base, in which said actuating element can be brought by rotation of the actuating crank into alignment with the blocking pin, with the result that, on actuation, the blocking pin, at the specific positions at which the annular shoulder is interrupted, can be engaged (retracted) into the path of the counter-abutment means, and wherein the crank arm is constructed as a two-armed lever pivotally journalled on the pivot pin having a shorter indexing arm and a longer actuating arm, of which the indexing arm, when the actuating arm is pivoted out into the crank position, acts force-transmittingly laterally on the actuating element to cause its actuation displacement towards the rose until the maximum actuation displaced position of the actuating element is reached, when this position is reached the force-transmitting engagement of the indexing arm with the actuating element is terminated and the return of the actuating element into its starting position is made possible by spring force, and the indexing arm, when the actuating arm is pivoted in into the at-rest position, displaces the actuating element laterally against spring force until the force engagement between indexing arm and actuating element is again restored in the starting position.

With an embodiment of the device constructed according to this invention, each complete pivoting-out movement of the actuating crank from the zero position into the rotational position, that is from that position in which the actuating crank is situated in the associated seating recess in the vehicle roof, leads to a displacement of the actuating element in the crank base and thus to a displacement of the blocking pin into its position which cancels rotational blocking. The indexing arm of the crank arm here entrains the actuating element slidingly towards the rose body by force-fitting engagement, the actuating element displacing the blocking pin against the spring force acting on it in order to cancel out the rotational blocking. If the displacement movement of the actuating element and blocking pin is completed at the end of the pivoting-out movement of the crank arm, then the operating crank can be rotated in either of the two directions of rotation for driving the sliding lid, whereupon the actuating element, after the force-fitting engagement with the indexing arm is canceled, is restored by spring force into its starting position. If the actuating crank is again pivoted back into the seating recess, for example after rotational actuation, then the actuating element yields laterally against spring force to the pivoting indexing arm until coupling of the indexing arm with the actuating element in the zero setting of the crank is again restored. The device according to this embodiment is of simple and reliable construction. The canceling out of rotational blocking is achieved by simply pivoting out the crank arm, which can be pivoted back into its starting position because an additional degree of freedom is granted to the actuating element, displaceable generally parallel to the shaft, which degree of freedom allows a lateral deflection of the actuating element relative to the indexing arm returning into its starting position as the crank arm is pivoted back.

The lateral deflection of the actuating element relative to the indexing arm returning into its starting position is preferably made possible, by a pivotal mounting of the actuating element.

The actuating element, in addition to its displacement capability, may be pivotally journalled in the crank base about a pivot axis extending parallel to the pivot pin.

The actuating element may possess two detent and entraining recesses, disposed one above another and separated by a separating web, and the indexing arm may be engageable optionally into one of the detent and entraining recesses and may move over from one recess into the other when the crank arm is pivoted, starting from its engagement into the lower recess, when the crank arm is pivoted outward, to displace the actuating element upwardly towards the rose until, on the transition over into the upper recess, the actuating element is displaced downwards by spring force back in the opposite direction, but starting from its engagement into the upper recess pivots only backwards and forwards about its pivot axis when the crank arm is pivoted in.

The spring force may act continually on the actuating element, the actuating element being continually prestressed, on the one hand towards a stop in the crank base which guides the sliding movement, and on the other hand in the downward direction leading away from the rose.

Mutually aligned bearing-journals may be mounted on two oppositely facing sides of the actuating element in the vicinity of its lower end to form the pivot axis of the actuating element, which journals engage slidably in elongate holes which are disposed opposite each other in the crank base and are aligned in the direction of sliding of the actuating element.

The spring force acting continuously on the actuating element may be applied by a helical compression spring which bears at one end against the side of the actuating element remote from the detent and entraining recesses and at the other end against a fixed surface in the crank base, the ends of the helical compression spring being so seated that the spring applies a force component towards the actuating element and additionally a downwardly orientated force component.

BRIEF DESCRIPTION OF THE DRAWINGS

The invention is explained in more detail below in an example of embodiment thereof in relation to the drawings. The figures in the drawings show.

DETAILED DESCRIPTION OF THE PREFERRED EMBODIMENT

Figure 1:
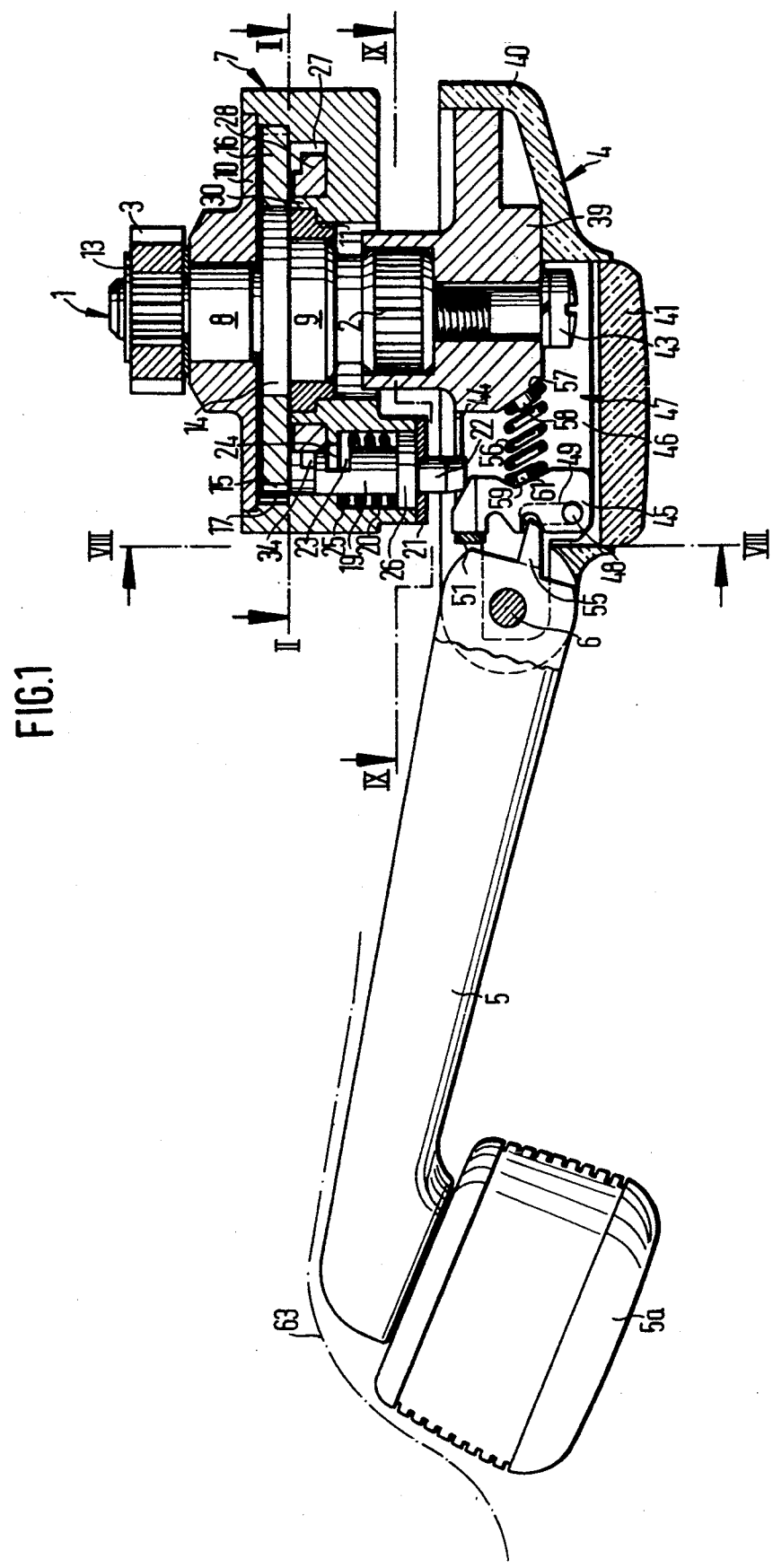
FIG. 1 a cross-section through the device with the actuating crank folded back in the at-rest position, FIG. 2 a section on the line II—II in FIG. 1, FIG. 3 the partial section along the line III—III in FIG. 2, FIGS. 4 & 5 in partial representation, lateral views of the blocking ring with blocking pin disengaged and engaged respectively, FIG. 6 an example of embodiment of the blocking ring in perspective view, FIG. 7 the actuating element in perspective view, FIG. 8 a sectional elevation along the line VIII—VIII in FIG. 1, FIG. 9; a sectional elevation along the line IX—IX in FIG. 1, FIG. 10 a cross-section similar to FIG. 1 with the crank partly cut away in an outwardly pivoted, intermediate position, in which the blocking pin still blocks the drive, FIG. 11 the section according to FIG. 10, but with the crank fully pivoted out and drive released by the blocking pin, FIG. 12 the section according to FIG. 10, but with the folded-out actuating crank rotated through 180°, FIG. 13 a section similar to FIG. 11 with the crank situated in the zero position, ready to be folded in, and blocking pin disengaged, FIG. 14 to enlarged scale, a partial section through the device which illustrates the movement sequence in pivoting out the actuating crank, and FIG. 15 the sectional view of FIG. 14, but showing the movement sequence when folding in the operating crank into its at-rest position.

To explain the basic, known construction of the device, reference is first made to FIGS. 1 to 6. A shaft 1 is provided at one end with a serrated head 2 and, at the other end, with a drive pinion 3 keyed to it, which is brought into engagement in known manner on opposite sides with two displaceably guided threaded cables (not shown) for actuating the sliding lid. An actuating crank is pushed onto the serrated head 2 and is provided for the purpose with a corresponding counter-serration. The crank comprises a crank base 4 and of a crank arm 5, on the outer end of which an actuating knob 5a is rotatably mounted. The crank base 4 and the crank arm 5 are connected in articulated manner by a pivot pin 6. A dead-center pin 18 acting between crank base 4 and crank arm 5 (FIG. 9) ensures that the crank arm 5 adopts a stable position in both of its possible folded positions being prestressed by the spring 18 relative to the crank base 4. The shaft 1, passing through a rose 7, is rotatably journalled at zones 8 and 9 respectively in a bearing cover 10 and a bearing ring 11, secured in the rose 7.

The rose 7 is provided with through bores 12 (FIG. 2) for mounting the device on a part of a vehicle body. The bearing cover 10 is set into the rose 7 and secured, for example at its circumference, by pinning. The drive pinion 3 is axially secured on the drive shaft 1 by a securing washer 13, engaged in a groove in the shaft.

Figure 2:
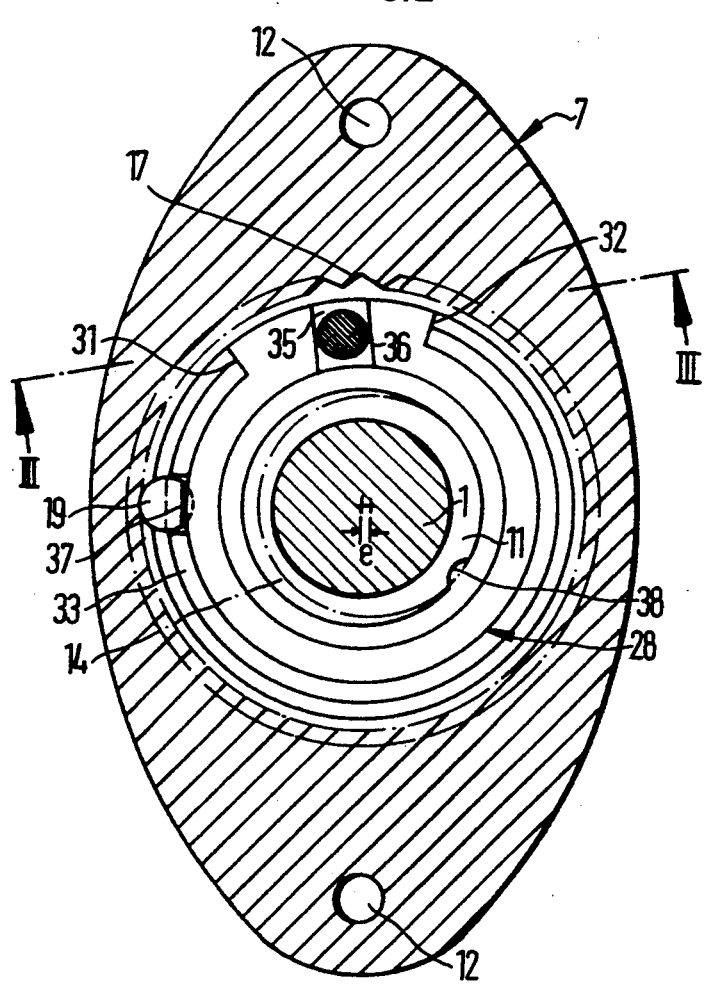
Figure 3:
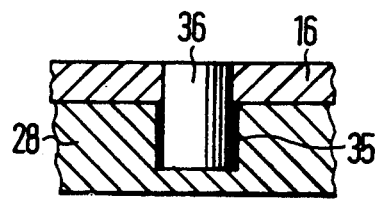
Figure 4:
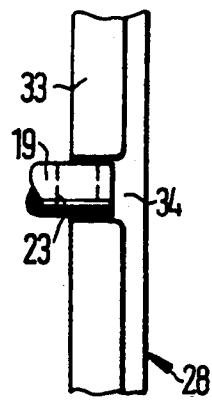
Figure 5:
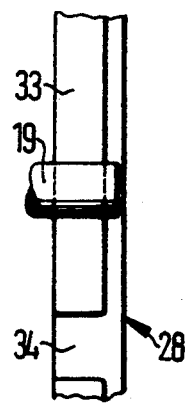

An eccentric disc 14 is fixed rigidly to the shaft and preferably integral with it and the eccentricity e of which from the central axis of the shaft is shown in FIG. 2. The disc journals a toothed ring 16 which is provided with external teeth 15, in engagement with the rose 7 by way of internal teeth 17 (FIG. 2). In the example shown, the external set of teeth 15 comprises 34 teeth, whereas the internal set 17 comprises 36 teeth.

The known method of operation of the device so far described is as follows: when the shaft 1, and the components torsionally keyed to it, are rotated by means of the actuating crank in the one or the other direction, the eccentric disc 14 moves the toothed ring 16, which thus rolls with its external teeth 15 in the stationary internal set of teeth 17. Since the numbers of teeth in the sets differ by two teeth, the relative position between the toothed ring 16 and the internal teeth 17 is displaced in the circumferential direction, after one revolution of the shaft 1, by the dimension of two toothed divisions. The toothed ring 16 thereby rotates in opposition to the rotational direction of the shaft 1, but with an angular speed smaller by orders of magnitude. It can therefore be seen that abutments mounted on the toothed ring and the association of stationary abutments must result, after an accurately determinable number of rotations of the shaft 1, in the stopping of the shaft and thus in the limitation of its revolutions, i.e. limitation of displacement of the components driven by the pinion 3.

The abutment means, which are disposed on the one hand on the rose 7 and on the other hand on the toothed ring 16, will now be explained. A blocking pin 19, slidably guided in the rose 7 parallel to the shaft 1, can best be seen from FIGS. 1 and 8. A cylindrical bore 20 in the rose 7 is closed to the outside by a lid 21, firmly connected to the rose 7. The lid is provided with an opening, which guides the portion 22 of the blocking pin 19 extending out of the rose 7. The end of the blocking pin 19, provided with a transverse recess 23, is guided in a bore 24 in the rose 7. A helical compression spring 25 is inserted into the annular space between the blocking pin 19 and the cylindrical bore 20 and bears at one end against a flange 26 fixed to the blocking pin 19, and at the other end against the rose 7. The bore 24 is continued as far as an annular channel 27, concentrically surrounding the shaft 1, into which channel the blocking pin 19 penetrates.

Figure 6:
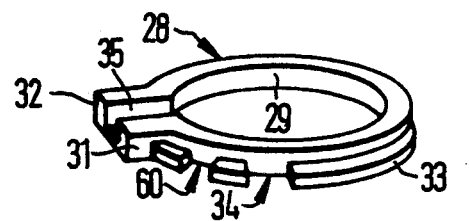

A blocking ring 28 is set in the annular channel 27, being rotatably journalled with its inner surface 29 (FIG. 6 on an annular projection 30 of the rose 7. Circumferential steps 31 and 32 (FIGS. 2, 6) are provided on and form the abutment means for the blocking ring 28. The annular shoulder 33 of the blocking ring 28, extending between the circumferential steps 31 and 32, is provided with a gap 34 for the passage of the blocking pin 19 in the zero setting. An additional gap or interruption 60 and possibly further gaps (not shown) mark intermediate positions, in which the device is rotationally blocked for raising and/or sliding intermediate positions of the sliding lid. Between the circumferential steps 31 and 32 there is a radial groove 35, which accepts an entraining pin 36 (FIGS. 2 and 3) mounted on the toothed ring 16. As a consequence of the slit-shaped form of the radial groove 35, the entraining pin 36 can slide in the radial groove to accommodate the eccentricity e when the toothed ring 16 rotates. For securing the blocking pin 19 against rotation, which must be prevented in the light of the desired engagement between its transverse recess 23 and the annular shoulder 33 of the blocking ring 28, this pin is provided at its inner end with a flattened zone 37 (FIG. 2) facing towards the blocking ring 28 and bearing against the latter in all positions.

In FIG. 2, an inner dot-and-dash circle illustrates the position of the eccentric disc 14 relative to the shaft 1 and the circular elements associated concentrically therewith of the rose 7. The rib 38, also visible in FIG. 2, prevents rotation of the bearing ring 11 which is provided with a corresponding recess.

Figure 8:
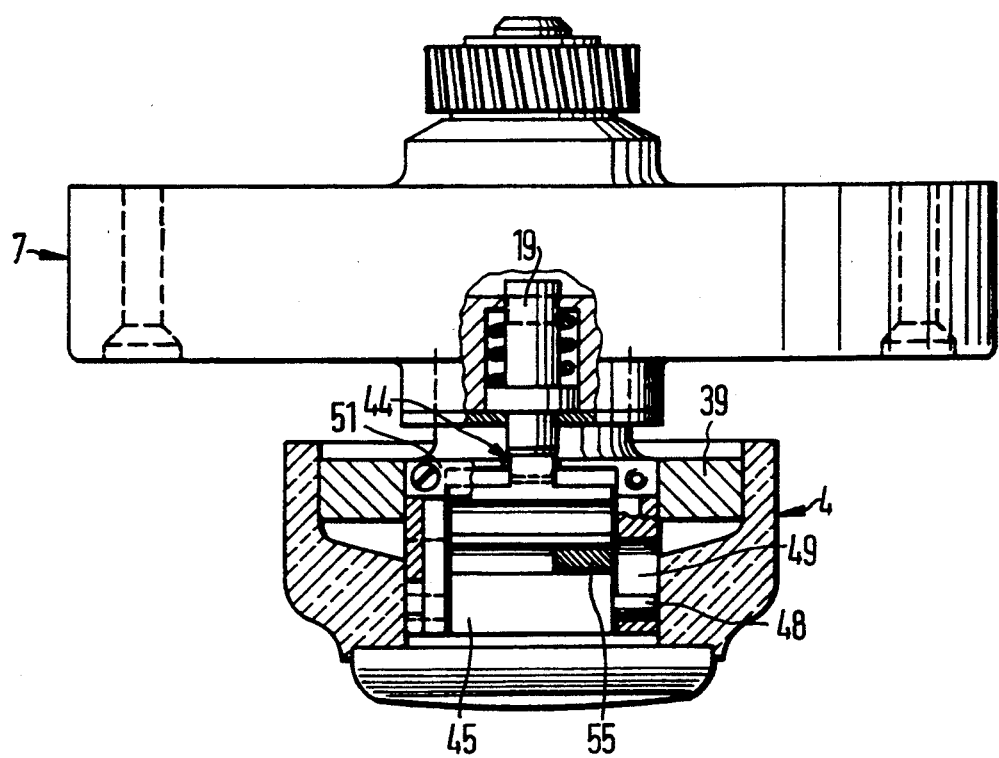
Figure 9:
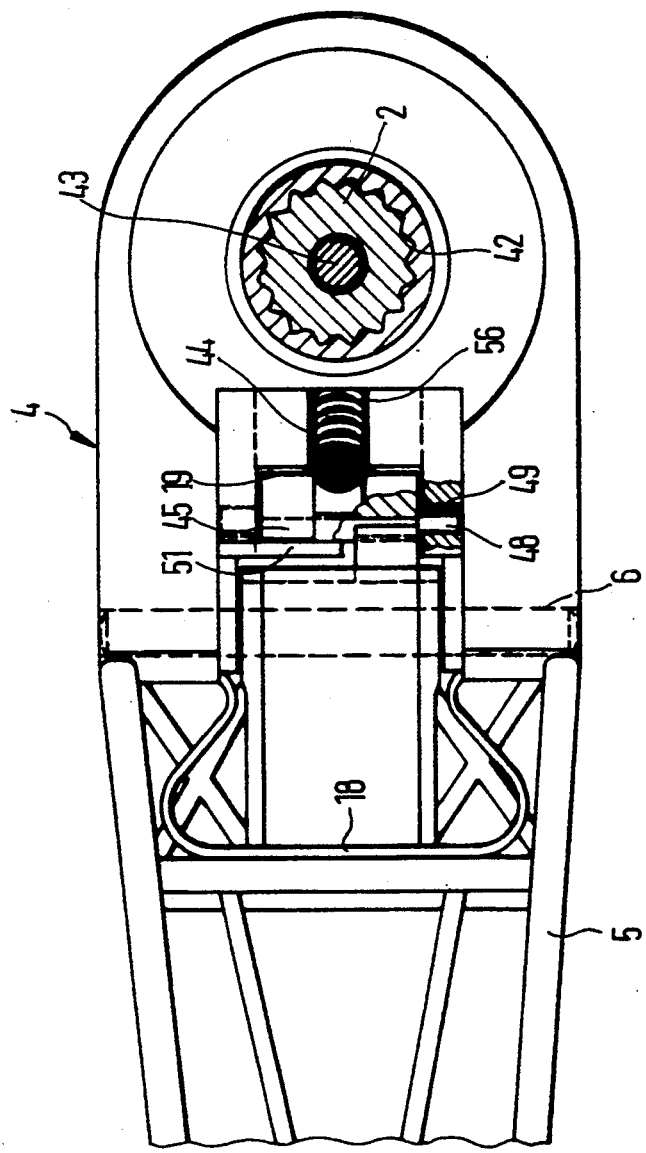

For explaining the construction of the crank base 4, reference is now made to FIG. 1, 8 and 9. The crank base 4 consists of a core 39, a cover 40 surrounding the core and fixed to it, and a lid 41, closing the mounting opening of the cover 40. In the core 39 there is a serrated recess 42, with which the crank base 4 is pushed form-fittingly and thus torsionally locked on the serrated head 2 of the shaft 1, as can be seen particularly in FIG. 9. A screw 43, passing through the core 39 and engaging into an internal thread of the shaft I and of the serrated head 2, fixes the crank base 4 to the shaft 1. The fixing to the shaft 1 takes place in a defined axial relative position of the crank base 4 and the rose 7, so that the crank base 4 can be rotationally blocked, in a manner yet to be described, by the region 22 of the blocking pin 19. For this purpose, in the surface of the crank base 4 facing towards the rose 7, there is a passage slit 44, the width of which is only slightly larger than the corresponding dimension of the region 22 of the blocking pin 19, engaging into it. When the blocking pin 19 is extended and its region 22 engages into the passage slit 44, then the device is rotationally blocked (FIG. 1). The construction according to this invention of the elements that optionally cancel the rotational blocking will now be described.

Figure 7:
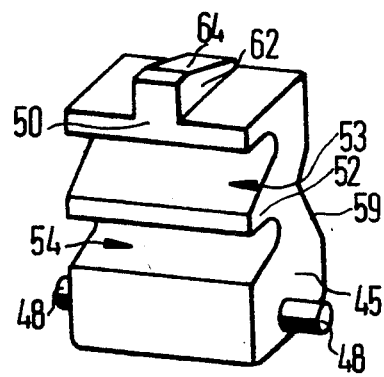

An actuating element 45, which cooperates with the blocking pin 19 in the crank base 4, is guided slidably in the tilting plane of the crank arm 5 and pivotally in a cavity 47 in the crank base 4 bounded by two parallel lateral walls 46. The pivot axis of the actuating element 45 is formed of two mutually aligned bearing journals 48, mounted on two opposite sides and in the vicinity of its lower end, which engage slidably and rotatably into opposite elongate holes 49 in the side walls 46. The elongate holes 49 are orientated in the direction of displacement of the actuating element 45, that is parallel to the shaft 1. The alignment of the elongate holes 49 corresponds to the direction of sliding of the actuating element 45, which for this purpose is mounted to slide with an upper front face 50 (FIG. 7) against a fixed transverse wall 51 of the crank base 4.

The actuating element 45 possesses two detent and entraining recesses 53 and 54, disposed one above the other and separated by a separating web 52. The indexing arm 55 of the crank arm 5, formed as a two-armed lever, is associated with these recesses 53, 54. The indexing arm 55 is situated, optionally, according to its pivoted position, either in the upper recess 53 or in the lower recess 54. Since the actuating element 45 can deflect by pivoting in specific phases of the movement sequence, the indexing arm 55 is enabled to pass over the separating web 52.

Against the side of the actuating element 45 remote from the detent and entraining recesses 53, 54, a helical compression spring bears with one end against the actuating element, while its other end bears with prestress against a fixed surface 57 of the crank base 4 or its core 39. The fixed surface 57 and a seating journal projecting from it, and a bearing surface 59, on the actuating element 45, having a seating journal 61 projecting therefrom, are each arranged at such an angle to the direction of displacement of the actuating element 45 that this element is permanently biased, on the one hand towards the transverse wall 51, forming a pivot stop for the actuating element 45, and on the other hand in the downward direction leading away from the rose 7. This is achieved by means of the helical compression spring 56, in that not only is this spring compressed with prestress in respect of its helical turns, but also it is upwardly bent by the fixed seating of its ends in the at-rest position shown in FIG. 1.

The actuating element 45 furthermore possesses at the top a nose 62, which is designed to cooperate with the lower end of the blocking pin 19 for the purpose of actuating same.

The method of operation of the device will now be explained starting from the at-rest position of the actuating crank as illustrated in FIG. 1. The actuating crank is here pivoted with its crank arm 5 into the seating recess 63 of the roof liner of an automobile, denoted by a dot-and-dash line in FIG. 1. This at-rest position of the actuating crank exists not only when the sliding lid is closed, i.e. when the blocking pin 19 is engaged into the gap 34 of the blocking ring 28, but also in each slit or pivoted open position of the sliding lid, provided that a release of the blocking pin 19 is made possible by an additional gap in the annular shoulder 33 of the blocking ring 28, for example by the gap 60. The blocking pin 19, extended as in FIG. 1, has the lower end of its region 22 engaged in the passage slit 44, with the result that the actuating crank is fixed against rotation and the drive is blocked. In this at-rest position, the indexing arm 55 is situated in the lower recess 54 of the actuating element 45. The actuating element 45 is situated in its furthermost downwardly displaced position and bears with its front face 50 against the transverse wall 51. In this position, the bearing journals 48 abut the lower wall faces of the elongate holes 49.

Figure 10:
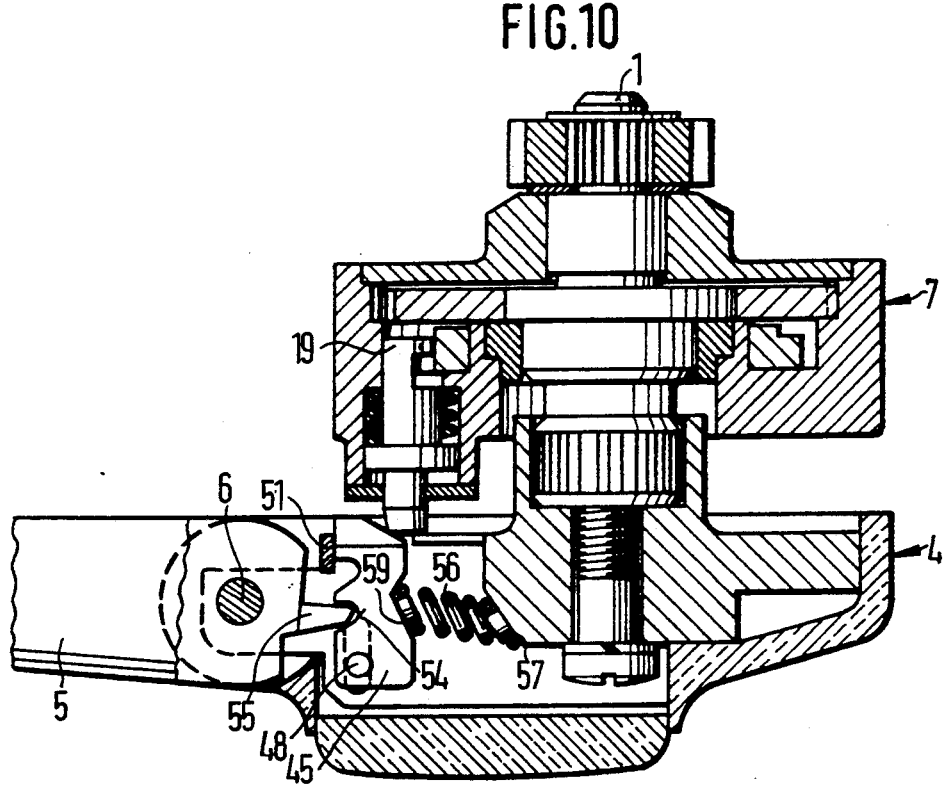

FIG. 10 illustrates how, during the pivoting out of the crank arm 5, the indexing arm 55, by its engagement into the lower recess 54, displaces the actuating element 45 upwardly, the actuating element 45 displacing the blocking pin 19. The drive is, however, still blocked, because the blocking pin 19 has not yet moved sufficiently far upwards to be able to receive the annular shoulder 33 of the blocking ring 28 in its transverse recess 23.

Figure 11:
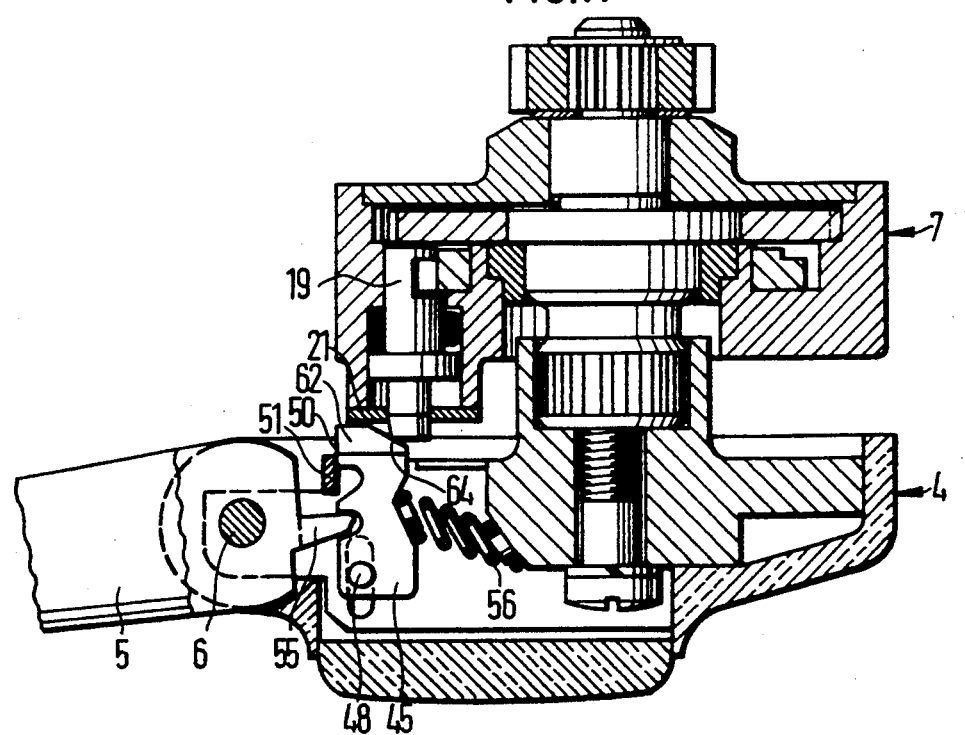
Figure 12:
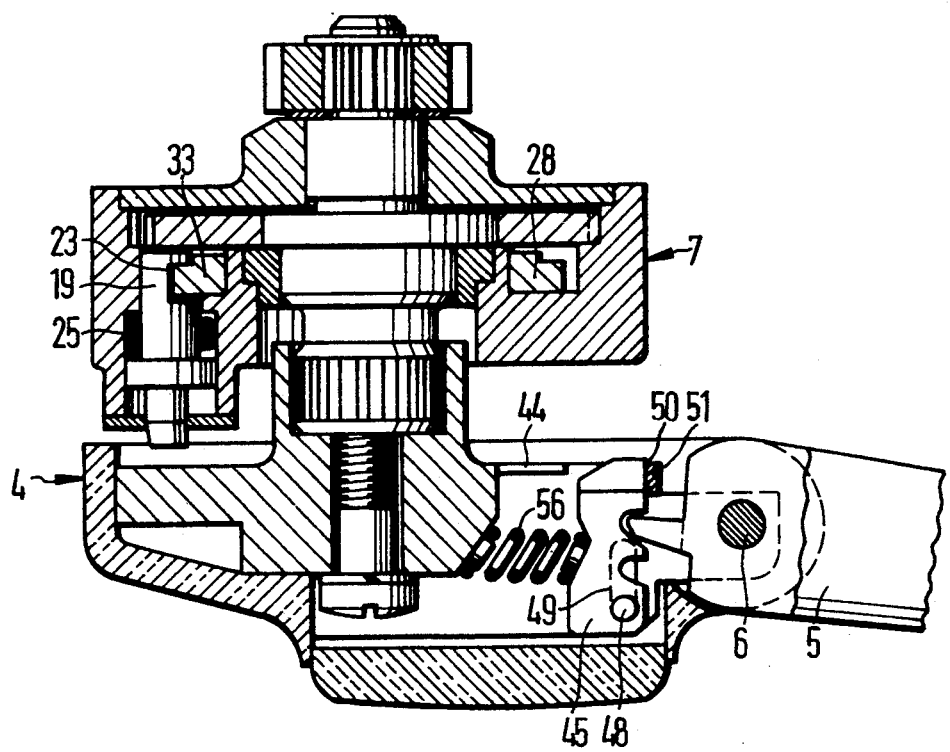
Figure 14:
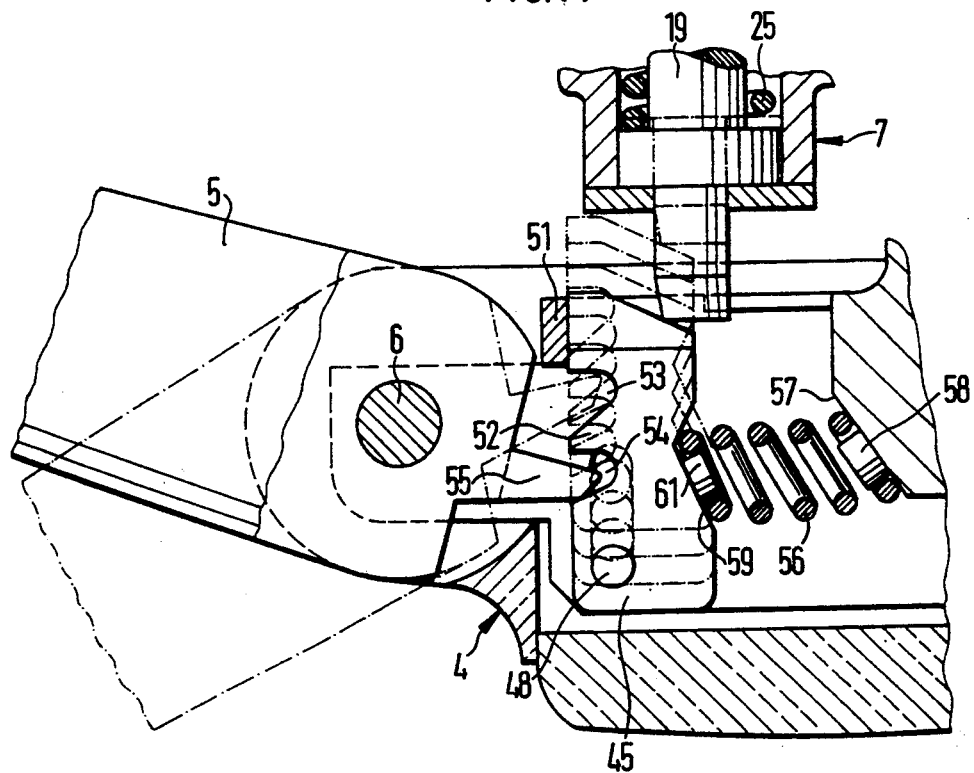

In FIG. 11, the crank arm 5 is pivoted fully downwards and is ready for rotation. The blocking pin 19 is now fully retracted and has moved out of the gap 34 (or gap 60 in the case of a partly outwardly pivoted sliding lid). The drive is now released and the actuating crank can be rotated as desired in the one or the other rotational direction. The indexing arm 55, engaging into the lower recess 54 and bearing against the separating web 52 from below, has entrained the actuating element 45 into the upper limiting position of displacement. The nose 62 may here bear against the lower face of the cover 21. The blocking pin 19 is still seated with its lower end on an inclined surface 64 of the actuating element 45. In this way the actuating element 4 is initially still prevented from pivoting clockwise (in FIG. 11) about the pivot bearings 48. If the actuating crank is rotated slightly in the one or other direction, the contact between the inclined surface 64 and the lower end of the blocking pin 19 is removed, so that the helical compression spring 56 can push the actuating element 45 back into its lower starting position (FIG. 1). As this occurs, the actuating element 45 pivots clockwise to cancel out the remaining engagement of the indexing arm 55 with the lower recess 54 of the actuating element 45, the front face 50 temporarily lifting off the transverse wall 51. After the separating web 52 has slid over the end of the indexing arm 55, the helical compression spring 56 moves the actuating element 45 into its lower limiting position, the front face 50 again bearing against the transverse wall 51. These operations occur very rapidly due to the spring force. The indexing arm 55 now engages into the upper recess 53 of the actuating element 45, as illustrated in FIG. 12. The movement phases in pivoting out the actuating crank are illustrated in FIG. 14. The sliding of the actuating element 45 upwards as a function of the angle of pivot of the crank arm 5 can be seen here, the blocking pin 19 being displaced from its extended position into its retracted position by the actuating element 45.

In FIG. 12, the actuating crank is situated in an intermediate rotated position during the displacement of the sliding lid. The actuating crank is fully pivoted out or unfolded, the drive is obviously unblocked and the blocking pin 19 is retracted and is prevented from axial displacements by the engagement of its transverse recess 23 with the annular shoulder 33 of the blocking ring 28, although the compressed helical compression spring 25 is tending towards extending the blocking pin 19. The actuating element 45 is in a stable, lower limiting position, in which its bearing pins 48 bear against the lower walls of the elongate holes 49, while its front face 50 bears against the transverse wall 51. If the actuating crank is brought into a rotational position in which it is opposite the seating recess 63, the crank arm 5 can be folded in into the seating recess 63, but this has no effect upon the blocking pin 19 so long as the latter is held in its retracted position. When the crank is pivoted in, however, the indexing arm 55, by its bearing against the upper face of the separating web 52, pivots the actuating element 45 against the force of the helical compression spring 56. As soon as the indexing arm 55 has slid back over the separating web 52, the helical compression spring 56 returns the actuating element 45 by pivoting in the opposite direction until the front face 50 bears against the transverse wall 51, the lower recess 54 receiving the indexing arm 55.

Figure 13:
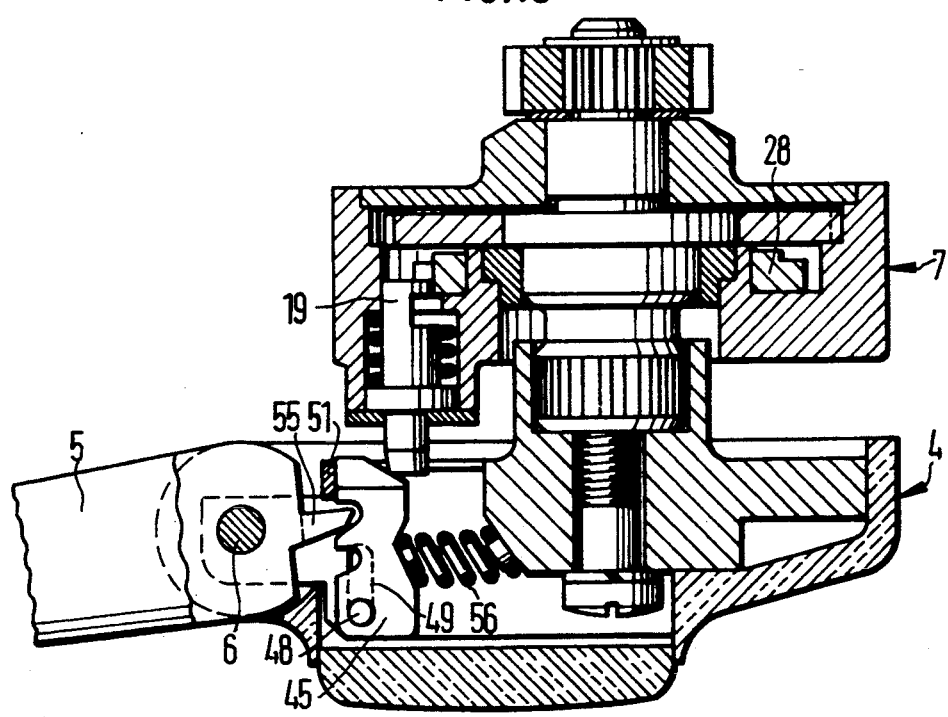

FIG. 13 illustrates the situation in which the actuating crank is again opposite the seating recess 63 shown in FIG. 1, but the blocking pin 19 has been extended by the helical compression spring 25 acting on it, because the engagement between its transverse recess 23 and the annular shoulder 33 is canceled at the position of a gap in the annular shoulder. The blocking pin 19 again engages into the passage slit 44 of the crank base 4 with the result that the actuating crank cannot be rotated. The drive is blocked. The actuating element 45 is still in its lower limiting position, but pivots back under the action of the indexing arm 55 as described above against the force of the helical compression spring 56 and thereafter, driven by the helical compression spring 56, again pivots forwards, when the actuating crank is folded in. At the end of the inward folding movement, the indexing arm 55 is again in the lower recess 54, as shown in FIG. 1.

Figure 15:
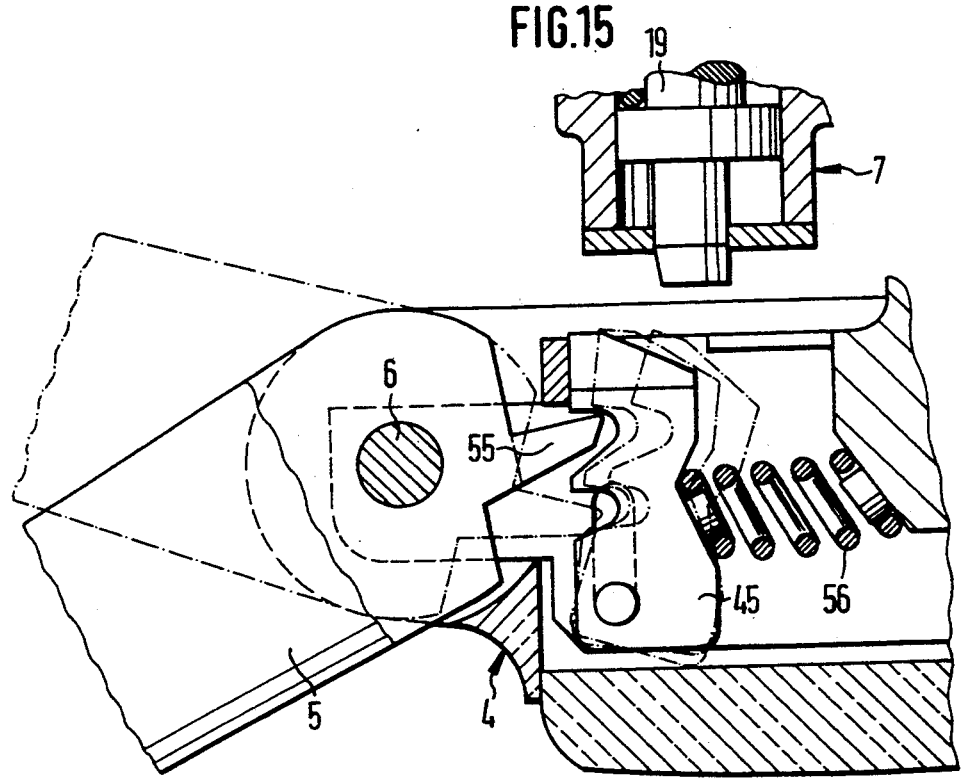

The movement sequence during pivoting in of the crank and in the passage of the index arm 55 from the upper recess 53 into the lower recess 54 is illustrated in individual phases in FIG. 15. In this figure, the blocking pin 19 is shown, as a difference from FIG. 13, in its retracted position.

I/We claim:

1. A device for limiting the number of revolutions of a shaft for rotary drives of sliding roofs in automobiles, comprising:

an actuating crank having a cranking position and an at-rest position, comprising a crank base and a crank arm, said crank base force-transmittingly engaging said shaft, and pivot means for articulating said crank arm to said crank base;

an eccentric disc rigidly fixed to said shaft, a toothed ring rotatably journalled on the circumferential surface of said disc, said toothed ring being provided with an external set of teeth and surrounded by an internal set of teeth fixedly disposed in a rose concentric to the shaft axis, the tooth foot radius of said internal teeth in said rose being greater than the tooth crest radius of said external teeth of said toothed ring by approximately the amount of eccentricity of said eccentric disc;

abutment and counter-abutment means defining limiting positions of said shaft after a predetermined number of revolutions have been reached, said abutment means connected to the rose and said counter-abutment means connected to the toothed ring;

said abutment means comprising a blocking member displaceably guided parallel to said shaft, a blocking member spring urging said blocking member away from said counter-abutment means;

said blocking member being engageable into the path of said counter-abutment means, and disengageable from the path of said counter-abutment means by said blocking member spring in only at least one specific position of said toothed ring, wherein in the engaged position, said blocking member allows rotation in both directions of rotation of said drive, and in its disengaged position blocks rotation of said drive in both directions;

said counter-abutment means comprising a blocking ring rotatably journalled concentric to the shaft and within the rose, said blocking ring having circumferential steps and being provided with a radial groove into which an entraining pin fixed to said toothed ring engages, said blocking ring having an annular shoulder located between said circumferential steps, said shoulder interrupted at least one fixed position for the passage of said blocking member;

said blocking member provided with a rotation preventing means and having a transverse recess for engagement with said annular shoulder of said blocking ring;

an actuating element disposed in the crank base, said actuating element having a starting position and being displaceably guided towards the rose such that said actuating element is aligned by rotation of said actuating crank with said blocking member, whereby said blocking member, at said fixed position(s) at which said annular shoulder of said blocking ring is interrupted, can be engaged into the path of said counter-abutment means, said actuating element prestressed by an actuating element spring;

said crank arm constructed as a two-armed lever pivotally journalled on said pivot means, said crank arm having a shorter indexing arm and a longer actuating arm;

said indexing arm, when said actuating arm is pivoted into the cranking position, acting force-transmittingly laterally to said actuating element to actuationally displace said actuating element towards the rose until a maximum actuational displacement is reached, whereupon the force-transmitting engagement of said indexing arm with said actuating element is terminated and said actuating element is returned to said starting position by said actuating element spring; and wherein when said actuating arm is pivoted into said at-rest position, said indexing arm displaces said actuating element laterally against said actuating element spring until the engagement between said indexing arm and said actuating element is again restored to the starting position.

2. A device according to claim 1, wherein said actuating element possesses lower and upper detent and entraining recesses separated by a separating web, said indexing arm engageable into said detent and entraining recesses, and wherein when said crank arm is pivoted into said cranking position from said at-rest position, said index arm engages said lower detent and entraining recess and displaces said actuating element upwards towards said rose to an upwardly displaced position corresponding to said maximum actuational displacement of said blocking member, and wherein upon subsequent rotation of said crank arm, said actuating member pivots away from said indexing arm allowing said indexing arm to pass over said separating web into said upper detent and entraining recess whereupon said actuating element spring restores said actuating member from said upwardly displaced position to said starting position, and wherein upon pivoting said crank arm into said at rest position, said indexing arm acts against said separating web causing said actuating member to pivot away from said indexing arm whereby said indexing arm engages said lower detent and entraining recess.

3. A device according to claim 1, wherein said actuating element spring continually prestresses said actuating member at the same time both towards a stop in said crank base which acts to guide said actuational displacement towards said rose and in a downward direction away from said rose.

4. A device according to claim 2, wherein said actuating element spring continually prestresses said actuating member at the same time both towards a stop in said crank base which acts to guide said actuational displacement towards said rose and in a downward direction away from said rose.

5. A device according to claim 1, wherein said actuating element is provided with mutually aligned bearing journals disposed parallel to said pivot means and located on opposing faces of said actuating element, said journals slidingly engaging respective elongate holes in said crank base, said elongate holes aligned in the direction of actuational displacement of said actuating member.

6. A device according to claim 2, wherein said actuating element is provided with mutually aligned bearing journals disposed parallel to said pivot means and located on opposing faces of said actuating element, said journals slidingly engaging respective elongate holes in said crank base, said elongate holes aligned in the direction of actuational displacement of said actuating member.

7. A device according to claim 3 wherein said actuating element is provided with mutually aligned bearing journals disposed parallel to said pivot means and located on opposing faces of said actuating element, said journals slidingly engaging respective elongate holes in said crank base, said elongate holes aligned in the direction of actuational displacement of said actuating member.

8. Device according to claim 2 in which said actuating element spring is a helical compression spring which bears at one end against the side of the actuating element remote from the detent and entraining recesses and at the other end against a fixed surface in the crank base, the ends of said helical compression spring being so seated that said actuating element spring applies a force component towards the actuating element and additionally a downwardly orientated force component.

9. Device according to claim 4 in which said actuating element spring is a helical compression spring which bears at one end against the side of the actuating element remote from the detent and entraining recesses and at the other end against a fixed surface in the crank base, the ends of said helical compression spring being so seated that said actuating element spring applies a force component towards the actuating element and additionally a downwardly orientated force component.

10. Device according to claim 6 in which said actuating element spring is a helical compression spring which bears at one end against the side of the actuating element remote from the detent and entraining recesses and at the other end against a fixed surface in the crank base, the ends of said helical compression spring being so seated that said actuating element spring applies a force component towards the actuating element and additionally a downwardly orientated force component.

* * * * *